June 4, 1929.  I. D. PERRY  1,715,619
BUMPER FOR VEHICLES
Original Filed July 13, 1925
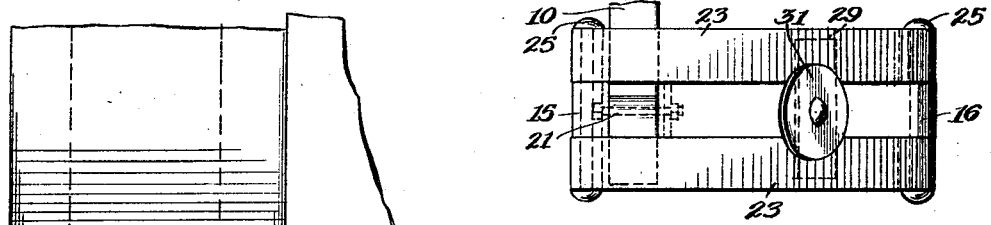
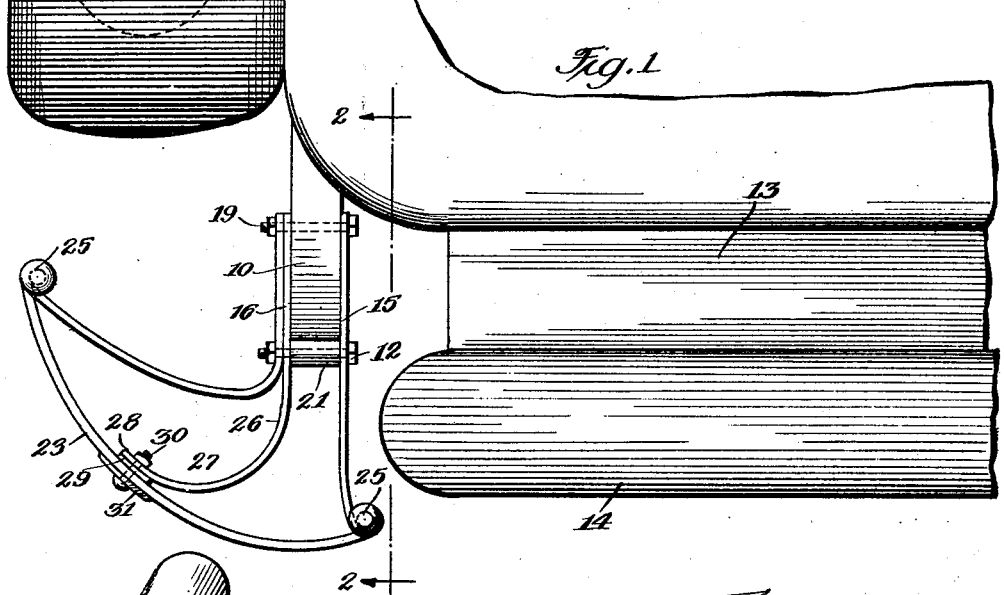
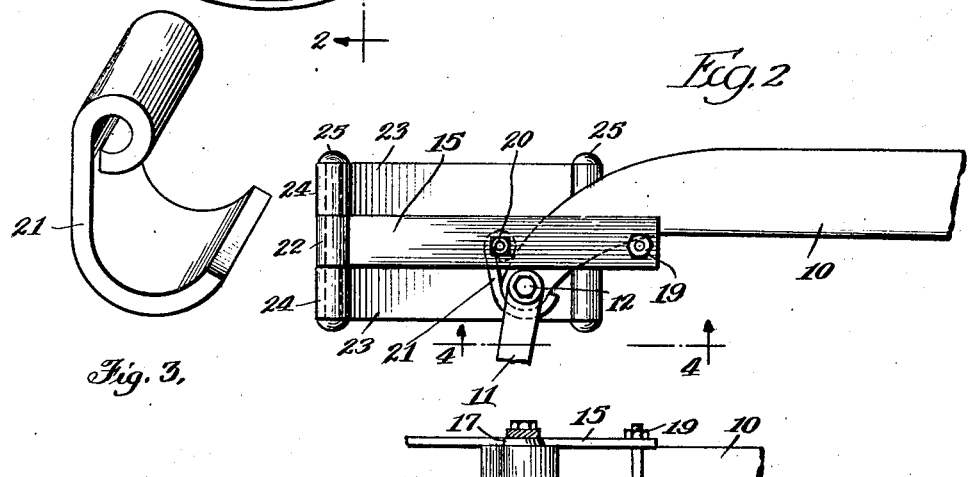
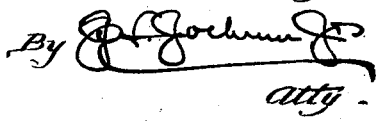
Inventor
Ira D. Perry
By
atty.

Patented June 4, 1929.

1,715,619

UNITED STATES PATENT OFFICE.

IRA D. PERRY, OF CHICAGO, ILLINOIS, ASSIGNOR TO ALBERT S. HEDSTROM, OF OAK PARK, ILLINOIS.

BUMPER FOR VEHICLES.

Application filed July 13, 1925, Serial No. 43,182. Renewed November 10, 1927.

This invention relates to improvements in bumpers for vehicles but more specifically it has reference to bumpers or guards for the rear of automobiles and is particularly adapted for use in protecting the rear end of the fenders from damage, and one of the objects of the invention is to provide an improved bumper of this character which will be of a resilient nature and at the same time the construction is such that it will be protected from collapsing when subjected to violent impact, and in which the strain will be uniformly distributed throughout the entire bumper.

A further object is to provide improved means for securing the bumper to the vehicle and for maintaining the same in position.

A still further object of the invention is to provide automobile bumpers applicable to the rear portions of motor vehicle frames, certain members of the bumpers being made of resilient material and so constructed and arranged as to be applied to automobile frames of various types and kinds.

To the attainment of these ends and the accomplishment of other new and useful results the invention consists in the features of novelty in substantially the construction, combination and arrangement of the several parts hereinafter more fully described and claimed and as shown in the accompanying drawing illustrating the invention, and in which drawing, Figure 1, is a top plan view of one form of a bumper of this character showing the same as applied to one side of a motor vehicle, a portion only of the vehicle being shown.

Figure 2, is a view as taken on line 2—2 Figure 1.

Figure 3, is a detail perspective view of one form of the fastening elements for the bumper.

Figure 4, is a detail view taken on line 4—4 Figure 2.

Figure 5, is a front elevation of the bumper.

Referring more particularly to the drawing the numeral 10 designates a rearward extension from the frame or chassis of an automobile and forms a hanger to which the customary spring shackle 11 is pivotally connected by means of a bolt 12. The numeral 13 designates the usual spare tire carrier and 14 the spare tire.

One of these bumpers is adapted to be secured to each side of the frame but as the construction of each is the same the description of one will apply to them both.

Arms 15, 16 are preferably, though not necessarily, disposed adjacent opposite side faces of the end 10 of the vehicle frame and rest upon the usual bosses or projections 17, 18 that surround the opening through which the spring shackle bolt 12 passes. A bolt 19 passes through the arms and engages under or against the lower face of the extension 10.

A bolt 20 passes across the space between the arms beyond and in close proximity to the extremity of the end 10 of the frame and supported by the bolt 20 is a hook shaped member 21 which engages under the end 10 of the frame and the bolt 12, the hook shaped member co-operating with the bolts 19, 20 for holding the bumper in position.

The inner arm 15 of the embodiment shown in the drawing extends rearwardly beyond the end 10 of the frame in a general direction parallel with the adjacent face of the frame and for any desirable or suitable distance and terminates preferably in a vertical eye or knuckle 22. The outer arm 16 beyond the end of the frame 10 is deflected away from the arm 15 and laterally with respect to the adjacent face of the frame 10 and also terminates in a vertical eye or knuckle.

An impact member 23 preferably of a resilient material such as spring steel extends across the space between the arms. This member 23 preferably embodies vertically spaced bars which terminate in vertical eyes or knuckles 24 which register with the respective eyes or knuckles on the arms 15 and 16 and bolts 25 pass through the registering knuckles to connect the parts together. The extremities of the arms 15, 16 stand between the spaced elements of the impact member 23.

The bumper of my invention may be made by utilizing more than two bars, as shown, the parts being then arranged in a similar manner with respect to one another and also with respect to the manner of attaching same to the vehicle frame.

A reinforcing member 26 is provided and is preferably in the form of an arm or bracket one end of which is preferably secured to the end 10 of the frame and the other end 27 projects beyond the end 10 of the frame and is deflected in a general direction away from the adjacent face of the frame 10, laterally with respect thereto and in the same general direction as the direction of deflection of the arm 16.

The extremity 28 is secured to the impact member 23 intermediate the ends of the latter and remote from such ends.

Any suitable means may be provided for this purpose such as a plate or member 29 which is secured to the member 23 and extends across the space therebetween. A fastening bolt 30 passes through the extremity of the member 26 and the plate 29 and also a plate or member 31, the latter being disposed on the outside of the bumper and also serves as a means of ornamentation.

With this improved construction it will be manifest that the impact member while being of a sufficient resiliency to yield when receiving an impact, it will be of a stout construction to resist such impact and by being reinforced by the member 26, the bumper will be prevented from collapsing or becoming permanently distorted as the strain will be equally distributed throughout the entire structure.

While the preferred form of the invention has been herein shown and described, it is to be understood that various changes may be made in the details of construction and in the combination and arrangement of the several parts within the scope of the claims without departing from the spirit of this invention.

What is claimed as new is;

1. The combination in an automobile, a bracket secured to the rear end of the frame, said bracket embodying spaced arms between which the frame projects, said arms extending beyond the end of the frame, one of the said arms being deflected away from the other arm, an impact member extending across the space between the arms and secured by its extremities to the respective arms, and a reinforcing bracket member secured by one end to the vehicle frame and by its other end to the said impact member intermediate the points of connection of the impact member with the said arms.

2. The combination in an automobile, a bracket secured to the rear end of the frame, said bracket embodying spaced arms between which the frame projects, said arms extending beyond the end of the frame, one of the said arms being deflected away from the other arm, an arc shaped impact member extending across the space between the arms and pivotally connected by its extremities to the respective arms, and a reinforcing bracket member secured by one end to the vehicle frame and by its other end to the said impact member intermediate the points of connection of the impact member with the said arms.

3. In combination with one end of an automobile frame, a bracket secured to said end and embodying spaced arms adjacent the lateral faces of said end, a fastening device engaging the arms and also engaging under said end of the frame, one of the arms beyond the said end of the frame being deflected away from the other arm, an impact member extending across the space between the arms and secured by its ends to the respective arms, a fastening bolt extending across the space between the arms in proximity to the said end of the vehicle frame, and a hook like member supported by the last said fastening device and hooking under the said end of the vehicle frame.

4. In combination with one end of an automobile frame, a bracket secured to said end and embodying spaced arms adjacent the lateral faces of said end, a fastening device engaging the arms and also engaging under the said end of the frame, one of the arms beyond the said end of the frame being deflected away from the other arm, an impact member extending across the space between the arms and secured by its ends to the respective arms, a fastening bolt extending across the space between the arms in proximity to the end of the vehicle frame, a hook like device supported by the last recited fastening device and hooking under the said end of the vehicle frame, and a reinforcing member extending from the vehicle frame and engaging and secured to the impact member at a point intermediate and spaced from the points of connection of the impact member with the said arms.

5. The combination in an automobile, a bracket secured to the rear end of the frame, said bracket embodying spaced arms between which the frame projects, said arms extending beyond the end of the frame, one of the said arms being deflected away from the other arm, an impact member extending across the space between the arms and secured by its extremities to the respective arms, and a reinforcing bracket member secured by one end to the vehicle frame and by its other end to the said impact member intermediate the points of connection of the impact member with the said arms, the end of the said reinforcing bracket member beyond the end of the vehicle frame being deflected in the same general direction as the said deflected portion of one of the said arms.

6. In combination with the rear end of a side bar of a vehicle frame, a guard for the rear end of the fender embodying two supporting arms adjacent the lateral faces of said bar, means securing the arms in position, one of said arms extending rearwardly in a general direction substantially parallel with the adjacent side of the vehicle frame, the other arm extending outwardly in a lateral direction from the adjacent side of the vehicle frame and away from the other said arm, an impact member extending across the space between the arms and secured by its extremities to the respective arms, and a reinforcing member extending beyond the end of the frame and deflected outwardly and laterally from the adjacent face of the frame, the end of said reinforcing member contacting and being secured to the impact member intermediate and remote from the ends of the latter.

7. In combination with the rear end of a side bar of a vehicle frame, a guard for the rear end of the fender embodying two supporting arms adjacent the lateral faces of said bar, means securing the arms in position, one of said arms extending rearwardly in a general direction substantially parallel with the adjacent side of the vehicle frame, the other arm extending outwardly in a lateral direction from the adjacent side of the vehicle frame and away from the other said arm, an impact member extending across the space between the arms and secured by its extremities to the respective said arms, and means securing the structure to the said frame and embodying a fastening bolt engaging the said arms and extending across the space therebetween beyond and in proximity to the vehicle frame, and a hook like member supported by said bolt and engaging under the said end of the vehicle frame.

In testimony whereof I have signed my name to this specification, on this 11th day of July, A. D. 1925.

IRA D. PERRY.